United States Patent [19]

Kotani et al.

[11] 4,376,846
[45] Mar. 15, 1983

[54] RUBBERY POLYMER BLENDS WITH ANILINO PHENYL UNITS

[75] Inventors: Teizo Kotani, Yokohama; Hiroji Enyo, Suzuka; Masaaki Watanabe, Hamamatsu; Yasuhiko Takemura, Yokkaichi, all of Japan

[73] Assignee: Japan Synthetic Rubber Co., Ltd., Tokyo, Japan

[21] Appl. No.: 250,038

[22] Filed: Apr. 1, 1981

[30] Foreign Application Priority Data

Apr. 3, 1980 [JP] Japan .................................. 55-42860

[51] Int. Cl.³ .......................... C08L 27/06; C08L 9/02
[52] U.S. Cl. .................................... 525/205; 525/213; 525/218
[58] Field of Search ................ 525/213, 214, 205, 218

[56] References Cited

U.S. PATENT DOCUMENTS

| | | | |
|---|---|---|---|
| 3,441,545 | 4/1969 | Blatz | 525/376 |
| 3,658,769 | 4/1972 | Kline | 526/262 |
| 3,767,628 | 10/1973 | Kline | 526/262 |
| 4,281,080 | 7/1981 | Bullard | 525/205 |

Primary Examiner—C. A. Henderson
Attorney, Agent, or Firm—Oblon, Fisher, Spivak, McClelland & Maier

[57] ABSTRACT

A rubbery polymer composition comprising (A) a copolymer consisting of 45 to 79% by weight of butadiene, 20 to 55% by weight of acrylonitrile and 0.1 to 10% by weight of at least one compound selected from the group consisting of amide compounds having the formula (I) shown below and imide compounds having the formula (II) shown below, and (B) a vinyl chloride polymer, the weight proportion of said (A) to said (B) being 95–40 to 5–60. Said composition is resistant to ozone and oil, and moreover, is excellent in heat aging resistance and sour gasoline resistance when used in an oil, in a solvent or in the atmosphere at a high temperature:

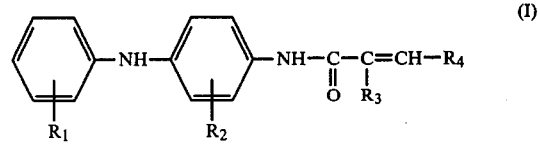

(I)

wherein $R_1$ and $R_2$ individually represent hydrogen, chlorine, bromine, or alkyl having 1 to 12 carbon atoms; $R_3$ represents hydrogen, or alkyl having 1 to 4 carbon atoms; and $R_4$ represents hydrogen, alkyl having 1 to 4 carbon atoms, or aryl having 6 to 12 carbon atoms,

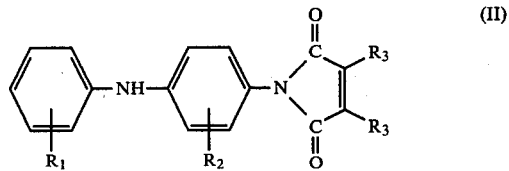

(II)

wherein $R_1$, $R_2$ and $R_3$ are as defined above, and two R's may be the same or different.

10 Claims, No Drawings
}

RUBBERY POLYMER BLENDS WITH ANILINO PHENYL UNITS

This invention relates to an ozone-resistant, oil-resistant rubbery polymer composition which is excellent in heat aging resistance and sour gasoline resistance when used in an oil, in a solvent, or in the atmosphere at a high temperature.

In recent years, the environment in which rubber articles are used has become severer, and in particular, the temperature in the area surrounding an engine have become higher than before because of an improvement of engine accompanying countermeasure of engine exhaust of automobiles. Gasoline is oxidized at high temperatures because it has become subjected to high pressure and high temperature and, therefore, the oxidized gasoline (hereinafter referred to as sour gasoline) becomes circulated. Thus, the advent of a material having sour gasoline resistance has been strongly desired. The sour gasoline resistance includes both oxidation deterioration resistance and ozone resistance. Among conventional polymer materials, fluororubber may be mentioned as one having satisfactory sour gasoline resistance. However, it has the serious defects that it is inferior in low-temperature resistance and expensive.

BACKGROUND OF THE INVENTION

As polymer compositions having excellent oxidation deterioration resistance, there are disclosed in, for example, U.S. Pat. Nos. 3,767,628 and 3,658,769 copolymers of butadiene or butadiene plus a vinyl compound and a specific amide or imide compound copolymerizable with them. However, these copolymers are not sufficient in oxidation deterioration resistance.

In order to meet the demands mentioned above, the present inventors have conducted extensive research to find a novel polymer composition.

SUMMARY OF THE INVENTION

According to this invention, there is provided a rubbery polymer composition excellent in heat resistance and sour gasoline resistance, which comprises (A) a copolymer consisting of 45 to 79% by weight of butadiene, 20 to 55% by weight of acrylonitrile and 0.1 to 10% by weight of at least one compound selected from the group consisting of amide compounds having the formula:

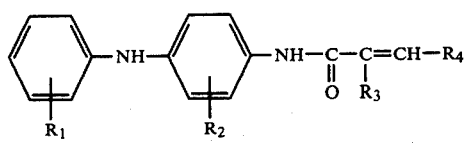

wherein $R_1$ and $R_2$ individually represent hydrogen, chlorine, bromine, or alkyl having 1 to 12 carbon atoms; $R_3$ represents hydrogen, or alkyl having 1 to 4 carbon atoms; and $R_4$ represents hydrogen, alkyl having 1 to 4 carbon atoms, or aryl having 6 to 12 carbon atoms, and imide compounds having the formula:

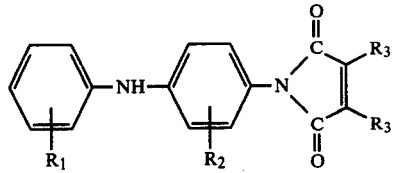

wherein $R_1$ and $R_2$ individually represent hydrogen, chlorine, bromine, or alkyl having 1 to 12 carbon atoms, and two $R_3$'s, which may be the same or different, represent hydrogen, or alkyl having 1 to 4 carbon atoms, and (B) a vinyl chloride polymer, the weight ratio of said (A) to said (B) being 95 - 40/5 - 60.

The use of the rubbery polymer composition of this invention enables the production of an ozone-resistant, oil-resistant rubber article which is excellent in heat resistance and sour gasoline resistance when used in an oil, in a solvent or in the atmosphere at a high temperature.

The copolymer (A) used in this invention is required to be composed of 45 to 79% by weight of butadiene, 20 to 55% by weight of acrylonitrile and 0.1 to 10% by weight of at least one of the specific amide and imide compounds. Preferably, the copolymer (A) is composed of 55 to 74% by weight of butadiene, 25 to 45% by weight of acrylonitrile and 0.5 to 5% by weight of at least one of the specific amide and imide compounds.

The amide compound and the imide compound are copolymerizable with butadiene and acrylonitrile and represented by the formula (I) and the formula (II), respectively:

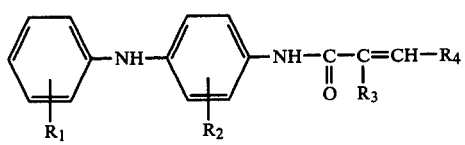

wherein $R_1$ and $R_2$ individually represent hydrogen, chlorine, bromine, or alkyl having 1 to 12 carbon atoms; $R_3$ represents hydrogen, or alkyl having 1 to 4 carbon atoms; and $R_4$ represents hydrogen, alkyl having 1 to 4 carbon atoms, or aryl having 6 to 12 carbon atoms,

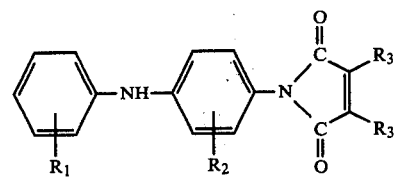

wherein $R_1$ and $R_2$ individually represent hydrogen, chlorine, bromine, or alkyl having 1 to 12 carbon atoms, and $R_3$'s, which may be the same or different, represent hydrogen, or alkyl having 1 to 4 carbon atoms.

The amide compound having the formula (I) includes, for example, N-(4-anilinophenyl)acrylamide, N-(4-anilinophenyl)methacrylamide, N-(4-anilinophenyl)cinnamamide, N-(4-anilinophenyl)crotonamide, N-[4-(4-methylanilino)phenyl]acrylamide, and N-[4-(4-methylanilino)phenyl]methacrylamide. Among them, N-(4-anilinophenyl)methacrylamide is particularly preferred.

The imide compound having the formula (II) includes, for example, N-(4-anilinophenyl)maleimide, and N-[4-(4-methylanilino)phenyl]maleimide.

In this invention, when the amount of the butadiene is less than 45% by weight, the composition is unsatisfactory in low-temperature resistance and rubbery property, and when it exceeds 79% by weight, the composition is poor in oil resistance. When the amount of the acrylonitrile exceeds 55% by weight, the composition is unsatisfactory in low-temperature resistance, and when it is less than 20% by weight, the composition is too low in oil resistance and compatibility with vinyl chloride polymers and is unsatisfactory in ozone resistance. When the amount of the bonded amide or imide is less than 0.1% by weight, the composition is unsatisfactory in heat aging resistance and sour gasoline resistance, and when it exceeds 10% by weight, the composition is unsatisfactory in low-temperature resistance and compression set.

The copolymer (A) of this invention is suitably prepared by an emulsion polymerization method. As the polymerization initiator, there are suitably used those known as "redox" initiators, for example, chelated iron salts, sodium formaldehyde sulfoxylate and organic hydroperoxides such as cumene and paramenthane hydroperoxides.

The vinyl chloride polymer (B) used in this invention include polyvinyl chloride and copolymers of vinyl chloride and vinyl acetate, ethylene, propylene, butadiene, styrene, or the like (Usually having a vinyl chloride content of 60 mole% or more, preferably 80 mole% or more). Said vinyl chloride polymer (B) preferably has a degree of polymerization of 500 to 2,000. The amount of the vinyl chloride polymer (B) is 5 to 60 parts by weight per 95 to 40 parts by weight of the copolymer (A). Preferably, the amount of the vinyl chloride polymer (B) is 15 to 40 parts by weight per 85 to 60 parts by weight of the copolymer (A). When it is less than 5 parts by weight, the composition is poor in ozone resistance and sour gasoline resistance, and when it exceeds 60 parts by weight, the composition is unsatisfactory in low-temperature resistance, compression set and rubbery property.

Any method of preparing the composition may be used though the following methods are suitable:

(a) A method by which the copolymer (A) and the vinyl chloride polymer (B) are mixed by means of a mixer such as a roll, a Banbury mixer, an inter mixer, or the like.

(b) A method by which the copolymer (A) and the vinyl chloride polymer (B) are mixed both in the form of a latex or a suspension, and the resulting mixture is subjected to coagulation treatment to coprecipitate them.

(c) A combination of the methods (a) and (b).

The rubbery polymer composition of this invention may be compounded with a usual reinforcing agent. Excellent heat resistance can be obtained by compounding particularly with silicon dioxide. The amount of the silicon dioxide used is 5 to 80 parts by weight, preferably 10 to 60 parts by weight, per 100 parts by weight of the polymer composition. When it is less than 5 parts by weight, no effect of improving the heat resistance is brought about, and when it exceeds 80 parts by weight, the hardness increases so much that the processability and the rubber elasticity are unsatisfactory.

The rubbery polymer obtained by this invention is compounded, if necessary, with conventional compounding agents such as a refinforcing agent, a filler, a plasticizer, a softening agent, a vulcanizing agent, a stabilizer, and the like, and then vulcanized, if necessary, and can be widely used not only for general purposes but also in the fields where heat resistance, weather resistance, ozone resistance, oil resistance, and the like are required. For example, it is suitably used in fuel hoses, printing rolls, oil seals, packings, diaphragms, and the like.

DESCRIPTION OF PREFERRED EMBODIMENTS

This invention is further explained below referring to Examples, which are not by way of limitation but by way of illustration. In the Examples, parts and percentages are by weight unless otherwise specified.

EXAMPLES 1 TO 9 AND COMPARATIVE EXAMPLES 1 TO 4

A copolymer composition comprising the copolymer (A) and the vinyl chloride polymer (B) in Table 2 was obtained by using the formulations shown in Table 1. Kneading was carried out by means of a Banbury mixer, and the composition obtained was press-vulcanized at 150° C. for 30 minutes to prepare a vulcanized composition for test.

TABLE 1

| Formulation I | Parts | Formulation II | Parts |
| --- | --- | --- | --- |
| (A) or (A) + (B) | 100 | (A) or (A) + (B) | 100 |
| MAF carbon | 30 | MAF carbon | 15 |
| Zinc oxide | 5 | Silicon dioxide | 15 |
| Stearic acid | 1 | Silane coupling agent (A-189)*3 | 0.2 |
| Accelerator TT*1 | 2 | | |
| | | MgO | 5 |
| Accelerator CZ*2 | 2 | | |
| | | Zinc oxide | 5 |
| Sulfur | 0.5 | | |
| | | Stearic acid | 1 |
| | | Accelerator TT*1 | 2 |
| | | Accelerator CZ*2 | 2 |
| | | Sulfur | 0.5 |

Note:
*1Tetramethylthiuramdisulfide
*2N—cyclohexyl-2-benzothioazylsulfenamide
*3γ-Mercaptopropyltrimethoxysilane The physical properties of the vulcanized compositions were measured according to the following methods:

(1) Tensile test: JIS K 6301
(2) Hardness test: JIS K 6301 (JIS A type)
(3) Aging test: JIS K 6301 (gear oven aging test, test conditions: 130° C.×120 hours)
(4) Compression set: JIS K 6301
(5) Ozone resistance: JIS K 6301 (40° C., 50 pphm, 20% elongation, 168 hours)
(6) Sour gasoline resistance: Sour gasoline was prepared by dissolving 1 g of t-butyl hydroperoxide in 100 ml of Fuel C. Three JIS No. 1 dumbbells were immersed in 200 ml of the sour gasoline obtained, and allowed to stand therein at 40° C. for 1 week. After the termination of the immersion test, the dumbbells were dried at room temperature for 24 hours, and their normal physical property values were measured.
(7) Oil resistance: JIS K 6301 (immersion test using test oil D, test conditions: 40° C.×48 hours)

The results of measurement of the compositions are shown in Table 2. As can be seen from Table 2, Examples 1-9 are excellent in heat resistance, sour gasoline resistance, oil resistance, and ozone resistance, and satisfactory in rubbery elasticity and compression set.

On the other hand, Comparative Example 1 is unsatisfactory in both ozone resistance and sour gasoline resistance since the amount of the vinyl chloride polymer (B) is as small as 2 parts, and Comparative Example 2 is too low in rubbery elasticity and too great in compression set since the amount of the vinyl chloride polymer (B) is as large as 65 parts. Comparative Example 3, in which the copolymer (A) is free from the amide and imide compounds, is unsatisfactory in heat resistance and sour gasoline resistance. Also, in Comparative Example 4, in which the amount of the amide or imide compound is too large, the compression set is too great and the rubbery elasticity is too low.

TABLE 2

|  | Example 1 | Example 2 | Example 3 | Example 4 | Example 5 | Example 6 | Example 7 | Example 8 | Example 9 |
|---|---|---|---|---|---|---|---|---|---|
| Copolymer (A) (parts) | 80 | 80 | 80 | 80 | 80 | 80 | 85 | 60 | 80 |
| Butadiene (parts) | 58 | 58 | 58 | 58 | 58 | 58 | 73 | 58 | 53 |
| Acrylonitrile (parts) | 40 | 40 | 40 | 40 | 40 | 40 | 25 | 40 | 40 |
| Amide compound*1 (parts) | 2 | 2 |  |  | 1 | 1 | 2 | 2 | 7 |
| Amide compound*2 (parts) |  |  | 2 |  | 1 |  |  |  |  |
| Imide compound*3 (parts) |  |  |  | 2 |  | 1 |  |  |  |
| Vinyl chloride polymer (B)*4 (parts) | 20 | 20 | 20 | 20 | 20 | 20 | 15 | 40 | 20 |
| Formulation | I | II | II | II | II | II | II | II | I |
| Normal physical properties |  |  |  |  |  |  |  |  |  |
| $M_{100}$ (kgf/cm$^2$) | 44 | 30 | 31 | 35 | 32 | 33 | 31 | 42 | 32 |
| $T_B$ (kgf/cm$^2$) | 232 | 241 | 245 | 248 | 244 | 242 | 240 | 248 | 244 |
| $E_B$ (%) | 460 | 570 | 560 | 550 | 560 | 550 | 580 | 510 | 560 |
| $H_S$ (JIS-A) | 73 | 69 | 69 | 71 | 69 | 70 | 68 | 72 | 67 |
| Heat resistance (change) 130° C. × 120 hrs |  |  |  |  |  |  |  |  |  |
| $\Delta T_B$ (%) | −6 | −5 | −8 | −7 | −6 | −8 | −4 | +5 | −4 |
| $\Delta E_B$ (%) | −45 | −36 | −37 | −38 | −35 | −37 | −32 | −45 | −35 |
| $\Delta H_S$ (point) | +10 | +9 | +10 | +10 | +10 | +10 | +7 | +13 | +8 |
| Compression set (%) 120° C. × 70 hrs | 32 | 37 | 39 | 38 | 38 | 38 | 34 | 42 | 39 |
| Ozone resistance | Good | Good | Good | Good | Good | Good | Good | Good | Good |
| Sour gasoline resistance |  |  |  |  |  |  |  |  |  |
| $E_B$ (%) | 230 | 320 | 310 | 290 | 300 | 290 | 290 | 350 | 330 |
| Oil resistance (volume change) (%) | 46 | 51 | 51 | 52 | 51 | 52 | 58 | 46 | 51 |

|  | Comparative Example 1 | Comparative Example 2 | Comparative Example 3 | Comparative Example 4 |
|---|---|---|---|---|
| Copolymer (A) (parts) | 98 | 35 | 80 | 80 |
| Butadiene (parts) | 58 | 58 | 60 | 45 |
| Acrylonitrile (parts) | 40 | 40 | 40 | 40 |
| Amide compound*1 (parts) | 2 | 2 |  | 15 |
| Amide compound*2 (parts) |  |  |  |  |
| Imide compound*3 (parts) |  |  |  |  |
| Vinyl chloride polymer (B)*4 (parts) | 2 | 65 | 20 | 20 |
| Formulation | I | I | I | I |
| Normal physical properties |  |  |  |  |
| $M_{100}$ (kgf/cm$^2$) | 42 | 110 | 48 | 45 |
| $T_B$ (kgf/cm$^2$) | 230 | 200 | 240 | 238 |
| $E_B$ (%) | 450 | 310 | 500 | 440 |
| $H_S$ (JIS-A) | 72 | 78 | 72 | 74 |
| Heat resistance (change) 130° C. × 120 hrs |  |  |  |  |
| $\Delta T_B$ (%) | −3 | +10 | −2 | −5 |
| $\Delta E_B$ (%) | −40 | −65 | −58 | −47 |
| $\Delta H_S$ (point) | +7 | +19 | +18 | +9 |
| Compression set (%) 120° C. × 70 hrs | 25 | 64 | 38 | 55 |
| Ozone resistance | Cracked | Good | Good | Good |
| Sour gasoline resistance |  |  |  |  |
| $E_B$ (%) | 160 | 290 | 180 | 230 |
| Oil resistance (volume change) (%) | 48 | 38 | 47 | 43 |

Note:
*1 N—(4-anilinophenyl)-methacrylamide
*2 N—(4-anilinophenyl)-acrylamide
*3 N—(4-anilinophenyl)-maleimide
*4 Vinychlon 3000M manufactured by Mitsui Toatsu Co., Ltd. (degree of polymerization: 1,100).

What is claimed is:

1. A rubbery polymer composition comprising (A) a copolymer consisting of (1) 45 to 79% by weight of butadiene, (2) 20 to 55% by weight of acrylonitrile, and (3) 0.1 to 10% by weight of at least one compound selected from the group consisting of amide compounds represented by the formula:

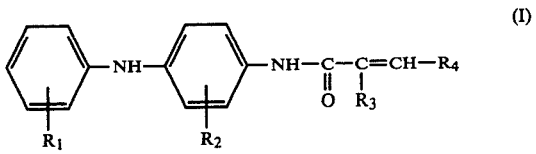

(I)

wherein $R_1$ and $R_2$ individually represent hydrogen, chlorine, bromine, or alkyl having 1 to 12 carbon atoms; $R_3$ represents hydrogen, or alkyl having 1 to 4 carbon atoms; and $R_4$ represents hydrogen, alkyl having 1 to 4 carbon atoms, or aryl having 6 to 12 carbon atoms, and imide compounds represented by the formula:

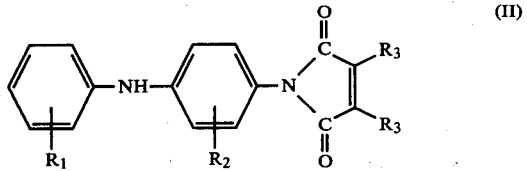

(II)

wherein $R_1$, $R_2$ and $R_3$ are as defined above and two $R_3$'s may be the same or different, and (B) a vinyl chloride polymer, which comprises polyvinyl chloride or a copolymer of vinyl chloride and vinyl acetate, ethylene, propylene, butadiene or styrene, said copolymer having a vinyl chloride content of 60 mole% or more, the weight ratio of said (A) to said (B) being 95- 45 to 5- 60.

2. A rubbery polymer composition according to claim 1, wherein the amide compounds of the formula (I) include N-(4-anilinophenyl)acrylamide, N-(4-anilinophenyl)methacrylamide, N-(4-anilinophenyl)cinnamamide, N-(4-anilinophenyl)crotonamide, N-[4-(4-methylanilino)phenyl]acrylamide and N-[4-(4-methylanilino)phenyl]methacrylamide, and the imide compounds of the formula (II) include N-(4-anilinophenyl)maleimide and N-[4-(4-methylanilino)phenyl]maleimide.

3. A rubbery polymer composition according to claim 1, wherein the amide compounds of the formula (I) include N-(4-anilinophenyl)methacrylamide and N-(4-anilinophenyl)acrylamide, and the imide compound of the formula (II) is N-(4-anilinophenyl)maleimide.

4. A rubbery polymer composition according to claim 1, wherein the component (3) is at least one amide compound of the formula (I).

5. A rubbery polymer composition according to claim 4, wherein the amide compound of the formula (I) is at least one compound selected from the group consisting of N-(4-anilinophenyl)acrylamide, N-(4-anilinophenyl)methacrylamide, N-(4-anilinophenyl)cinnamide, N-(4-anilinophenyl)crotonamide, N-[4-(4-methylanilino)phenyl]acrylamide and N-[4-(4-methylanilino)phenyl]methacrylamide.

6. A rubbery polymer composition according to claim 4, wherein the amide compound of the formula (I) is N-(4-anilinophenyl)acrylamide or N-(4-anilinophenyl)maleimide.

7. A rubbery polymer composition according to claim 1, wherein the component (3) is N-(4-anilinophenyl)maleimide or N-[4-(4-methylanilino)phenyl]maleimide.

8. A rubbery polymer composition according to claim 1, wherein the copolymer (A) is composed of 55 to 74% by weight of butadiene, 25 to 45% by weight of acrylonitrile and 0.5 to 5% by weight of at least one compound selected from the amide compounds of formula (I) and the imide compounds of formula (II).

9. A rubbery polymer composition according to claim 1, wherein the amount of the vinyl chloride polymer (B) is 15 to 40 parts by weight per 85 to 60 parts by weight of the copolymer (A).

10. A rubbery polymer composition according to claim 8, wherein the vinyl chloride polymer (B) has a degree of polymerization of 500 to 2,000.

* * * * *